United States Patent [19]

Steigerwald et al.

[11] Patent Number: 5,119,283
[45] Date of Patent: Jun. 2, 1992

[54] HIGH POWER FACTOR, VOLTAGE-DOUBLER RECTIFIER

[75] Inventors: Robert L. Steigerwald, Burnt Hills; Charles S. Korman, Schenectady, both of N.Y.

[73] Assignee: General Electric Company, Schenectady, N.Y.

[21] Appl. No.: 712,371

[22] Filed: Jun. 10, 1991

[51] Int. Cl.$^5$ .......................... H02M 5/458
[52] U.S. Cl. ........................ 363/37; 363/61; 363/90; 363/101; 363/143; 323/207
[58] Field of Search ............... 323/207, 208, 17; 363/37, 61, 81, 82, 90, 101, 126, 143

[56] References Cited

U.S. PATENT DOCUMENTS

| | | | |
|---|---|---|---|
| 3,851,182 | 11/1974 | Wallace | 363/143 |
| 4,642,745 | 2/1987 | Steigerwald et al. | 363/37 |
| 4,780,805 | 10/1988 | Chewuk et al. | 363/143 |
| 4,930,061 | 5/1990 | Slack et al. | 323/208 |
| 4,959,766 | 9/1990 | Jain | 33/126 |
| 4,967,333 | 10/1990 | Callier et al. | 33/61 |

Primary Examiner—Jeffrey L. Sterrett
Attorney, Agent, or Firm—Jill M. Breedlove; James C. Davis, Jr.; Marvin Snyder

[57] ABSTRACT

A voltage-doubler rectifier includes an ac fullbridge diode rectifier and a dc-to-dc converter having two output boost circuits. One of the output boost circuits is coupled between the rectifier and a dc link, and the other output boost circuit is coupled, with opposite polarity, between the rectifier and the circuit common. Two series-connected filter capacitors are also coupled between the dc link and the circuit common. In a preferred embodiment, the two output boost circuits each comprise either a series, parallel, or combination series/parallel resonant circuit and a rectifier. A switch is coupled between the junction joining one pair of diodes of the rectifier and the junction joining the two filter capacitors. For a relatively high ac line voltage, the switch is open, and the circuit operates in a low boost mode. For a relatively low ac line voltage, the switch is closed, and the circuit operates in a high boost, or voltage-doubling, mode.

7 Claims, 3 Drawing Sheets

HIGH POWER FACTOR, VOLTAGE-DOUBLER RECTIFIER

FIELD OF THE INVENTION

The present invention relates generally to ac-to-dc power converters and, more particularly, to a voltage-doubler rectifier, applicable to both U.S. and European ac power sources, which operates with high power factor and low harmonic distortion.

BACKGROUND OF THE INVENTION

Conventional rectifier circuits with capacitive output filters have relatively low power factors which limit the power that can be drawn from an ac line to a fraction of the rating of the line. Furthermore, highly distorted ac line currents are drawn by these conventional rectifiers, often causing interference with other electrical equipment in addition to equipment overcurrents and overvoltages. Techniques for improving power factor include passive waveform shaping methods, i.e. using input filters, and active methods, i.e. using boost or buck converter topologies. Such conventional active methods of obtaining high power factor generally employ a completely separate upfront converter to attain the high power factor followed by a dc-to-dc converter to produce the desired regulated dc output voltage. Thus, the power is converted twice, which is costly and inefficient. Moreover, the up-front converter must convert the entire delivered power. In fact, it must convert a peak power equal to twice the average power delivered.

A high power factor dc output power supply having only one power stage is described in commonly assigned, copending U.S. patent application of R.L. Steigerwald, Ser. No. 652,831, filed Feb. 8, 1991, which is incorporated by reference herein. The power supply of the Steigerwald patent application includes a dual-output switching converter having a first output coupled in series between a rectifier circuit and the input to the switching converter for providing a high power factor, and a second output for providing a regulated dc voltage at the power supply output. The first and second outputs are decoupled, resulting in a power supply capable of drawing high quality current waveforms from an ac source while producing a regulated dc output voltage with fast transient response. Furthermore, with the aforementioned Steigerwald power supply, high power factor is obtained without requiring a separate up-front power converter so that the power delivered by the supply does not have to be converted twice.

In addition to the hereinabove enumerated advantages of the high power factor power supply of the Steigerwald patent application, Ser. No. 652,831, cited hereinabove, it is also desirable to provide a high power factor, voltage-doubler rectifier for power conversion over a very wide input voltage range, e.g., applicable to both U.S. and European ac power sources. Conventional voltage-doubler rectifiers have poor power factor and relatively high harmonic distortion. Unfortunately, a practical solution is not to merely increase the boost voltage of the aforementioned Steigerwald power supply in order to offset a low input line voltage, because substantial circulating power, i.e., power greater than that delivered to the dc link, would result.

OBJECTS OF THE INVENTION

Accordingly, an object of the present invention is to provide a new and improved voltage-doubler rectifier operating with high power factor.

Another object of the present invention is to provide a high power factor, voltage-doubler rectifier which operates at high power factor without having to convert the entire power twice.

Yet another object of the present invention is to provide a high power factor, voltage-doubler rectifier applicable to both U.S. and European ac power sources.

SUMMARY OF THE INVENTION

These and other objects of the present invention are achieved in a new and improved voltage-doubler rectifier including a full-wave diode rectifier and a dc-to-dc converter having two output boost circuits. One of the output boost circuits is coupled between the diode rectifier and a positive dc link, and the other output boost circuit is coupled between the diode rectifier and the circuit common, i.e., negative dc link. Two series-connected filter capacitors are also coupled between the positive dc link and the circuit common. In one preferred embodiment, the two output boost circuits each comprise either a series, parallel, or combination series/parallel resonant circuit and a rectifier. A switch means is coupled between the junction joining one pair of diodes of the full-bridge rectifier and the junction joining the two filter capacitors. For a relatively high ac line voltage, the switch means is open, and the circuit operates in a low boost mode. On the other hand, for a relatively low ac line voltage, the switch means is closed, and the circuit operates in a high boost, or voltage-doubling, mode. Preferably, the switch means operates automatically. Advantageously, the voltage-doubler rectifier of the present invention enables efficient converter operation at high power factor over a wide ac input voltage range by providing a voltage doubler dc output voltage (i.e., a positive dc link voltage) in a substantially constant range. Such a voltage-doubler rectifier is thus applicable to, for example, both U.S. and European ac power sources.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
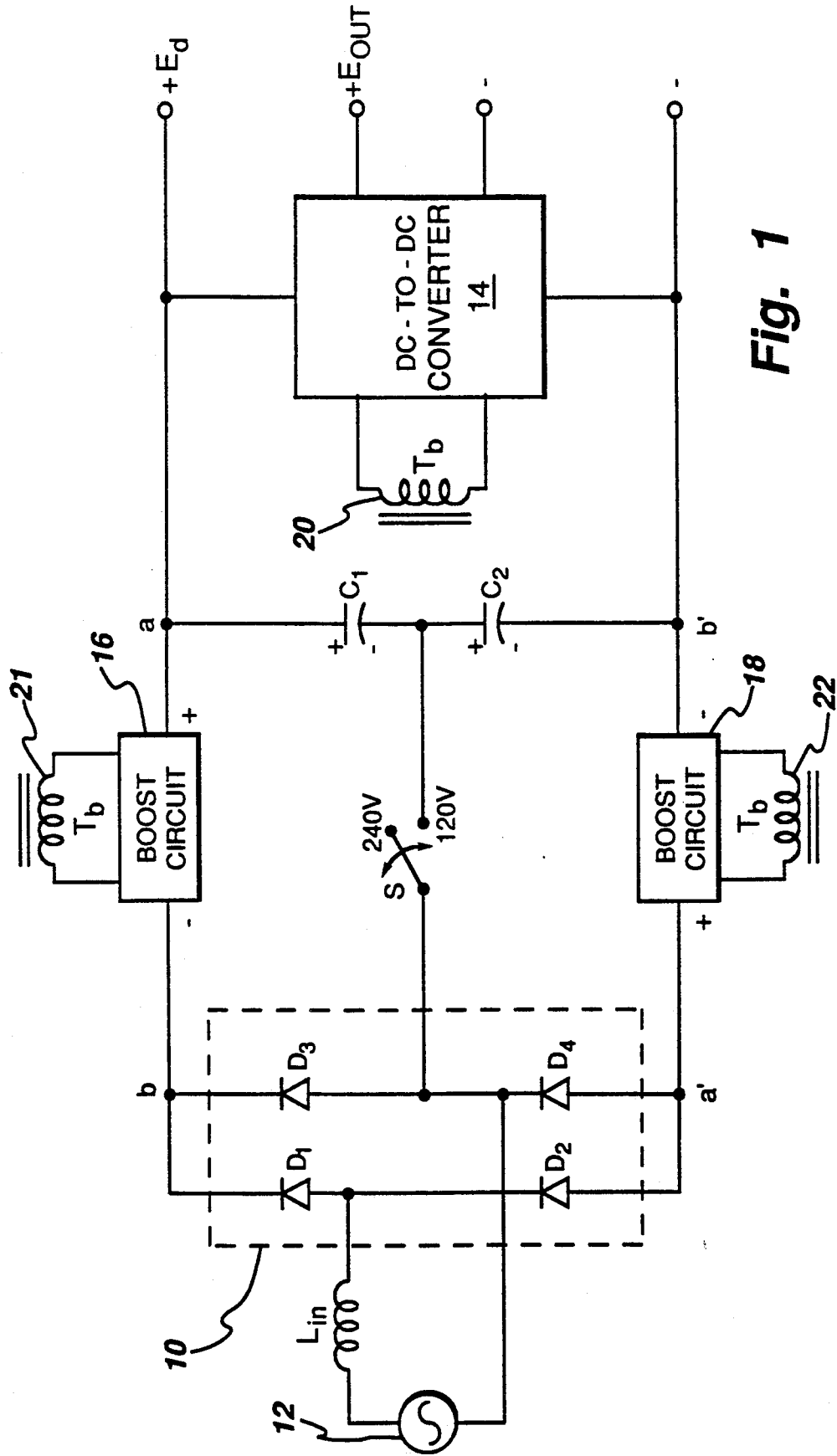
FIG. 1 is a schematic illustration of a voltage-doubler rectifier according to the present invention.

FIG. 1 illustrates a voltage-doubler rectifier (also referred to herein as a voltage doubler) according to the present invention. As shown, the voltage doubler includes a full-wave rectifier 10, having diodes $D_1$–$D_4$ connected together in a full-bridge configuration, coupled through an input filter inductor $L_{in}$ to ac power source 12. A dual-output, dc-to-dc converter 14 is coupled between a positive dc link voltage $E_d$ and the circuit common. Two filter capacitors $C_1$ and $C_2$ are also coupled between the dc link voltage $E_d$ and the circuit common. The dc-to-dc converter has two output boost circuits 16 and 18 inductively coupled thereto via a boost transformer $T_b$ having a primary winding 20 and two secondary windings 21 and 22. One of the output boost circuits 16 is connected in series between rectifier 10 and the dc link voltage $E_d$; and the other output boost circuit 18 is connected, with opposite polarity, in series between the rectifier and the circuit common. Boost circuit 16 generates an output boost voltage $V_{ab}$ between terminals a and b; and boost circuit 18 generates an output boost voltage $V_{a'b'}$ between terminals a' and b'. A switch S is coupled between the junctions joining diodes $D_3$ and $D_4$ of full-bridge rectifier 10 and filter capacitors $C_1$ and $C_2$, respectively. The switch S preferably operates automatically according to methods well-known in the art. The dc-to-dc converter 14 provides a regulated dc output voltage $E_{out}$.

In operation, for relatively high ac line voltages (e.g. 240V in Europe), the switch S is open, and operation is in a low boost mode. That is, the rectifier diodes $D_1$–$D_4$ act as a conventional full-wave rectifier, and the series boost voltages $V_{ab}$ and $V_{a'b'}$ are added in series with the rectifier 10 and the dc link filter capacitors $C_1$ and $C_2$. On the other hand, for relatively low ac line voltages (e.g. 120V in the U.S.), the switch S is closed, and operation is in a high boost, or voltage-doubling, mode. In the voltage-doubling mode, during one half cycle of the ac line voltage, current flows through diode $D_1$ and boost circuit 16 to charge capacitor $C_1$ through switch S. Similarly, during the next half cycle, current flows through diode $D_2$ and boost circuit 18 to charge capacitor $C_2$ through switch S. During the voltage-doubling mode, each capacitor $C_1$ and $C_2$ is charged to a voltage higher than the peak of the ac line voltage so that the series combination of the voltages across capacitors $C_1$ and $C_2$ results in the same dc link voltage $E_d$ as when the switch S was open, i.e., during the low boost mode. Furthermore, during each half cycle, the respective boost voltages, $V_{ab}$ and $V_{a'b'}$, are controlled as described hereinbelow such that near sinusoidal currents are drawn from the ac line. The result is high power factor voltage doubling.

Figure 2:
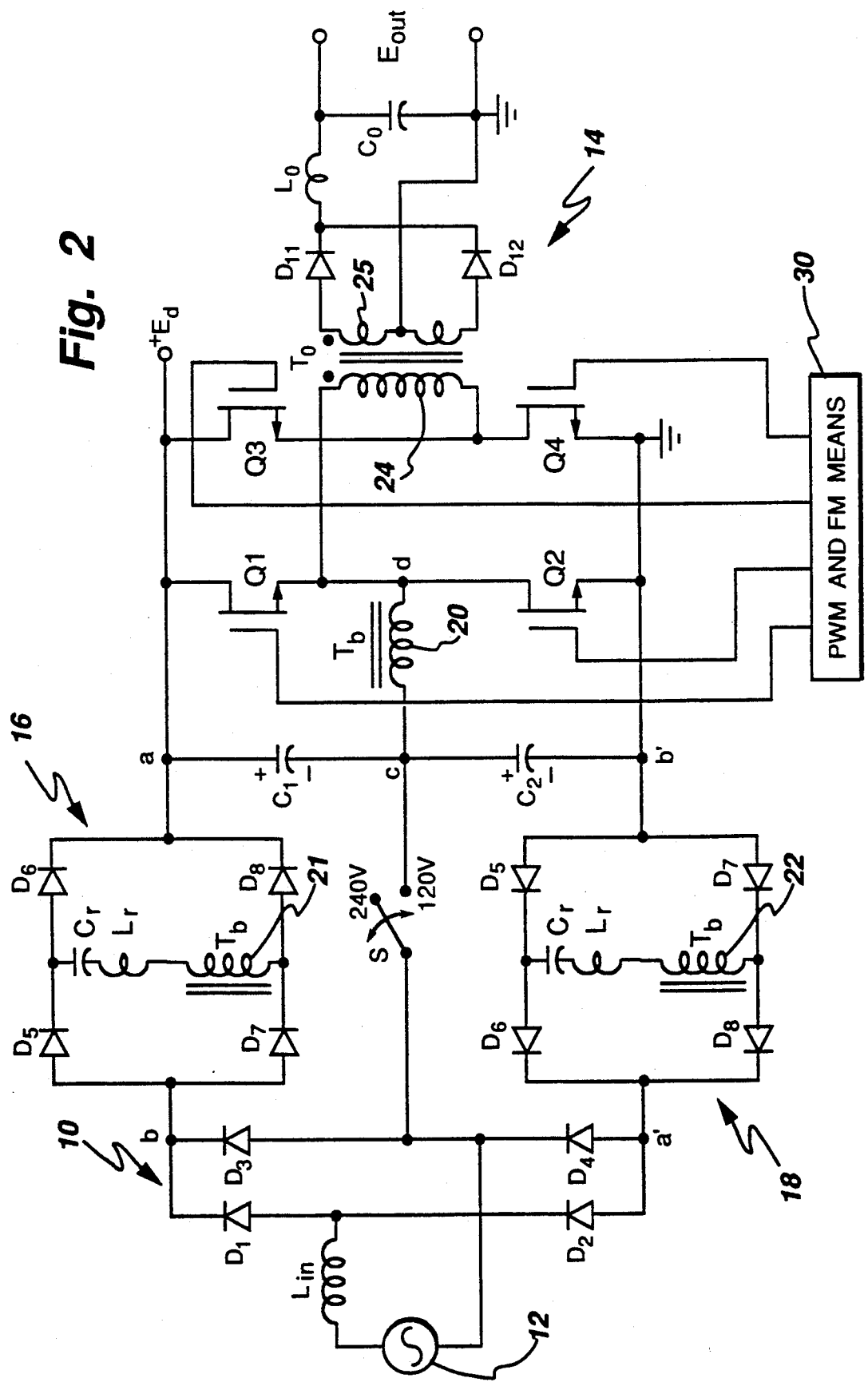
FIG. 2 is a schematic illustration of a power supply employing a voltage-doubler rectifier according to a preferred embodiment invention.

FIG. 2 illustrates a high power factor voltage-doubler rectifier in accordance with a preferred embodiment of the present invention. As shown, dual-output, dc-to-dc converter 14 has a phase-shifted, PWM-controlled output and a resonant output. (However, it is to be understood that the principles of the present invention apply to other types of dual-output converters, e.g., load-resonant, quasi-resonant, hard-switched PWM converters and the like.) Converter 14 includes a full-bridge connection of switching devices $Q_1$–$Q_4$ 1 between the dc link voltage Ed and the circuit common. Pulse width modulation and frequency modulation (PWM and FM) means 30 is shown as being coupled to the gates of switching devices $Q_1$–$Q_4$. The output boost circuits 16 and 18 of resonant converter 14 are each illustrated in FIG. 2 as including a resonant capacitor $C_r$ and a resonant inductor $L_r$ coupled in series with each other and with a boost transformer secondary winding 21 and 22, respectively. The output boost circuits 16 and 18 of FIG. 2 each further include a full-wave bridge rectifier comprising diodes $D_5$–$D_8$. In boost circuit 16, the anodes of diodes $D_5$ and $D_7$ are connected to the dc link at terminal b, and the cathodes of diodes $D_6$ and $D_8$ of boost circuit 16 are connected to the dc link at terminal a. Conversely, in boost circuit 18, the anodes of diodes $D_5$ and $D_6$ are connected to the dc link at terminal b', and the cathodes of diodes $D_6$ and $D_8$ are connected to the full-bridge rectifier 10 at terminal a'. In each boost circuit, the series resonant circuit is coupled between the junctions joining diodes $D_5$–$D_6$ and $D_7$–$D_8$, respectively. However, although the resonant circuits are illustrated as being situated on the secondary side of the boost transformer $T_b$, the resonant circuits may alternatively be situated on the primary side, as will be appreciated by those of ordinary skill in the art.

Figure 3A:
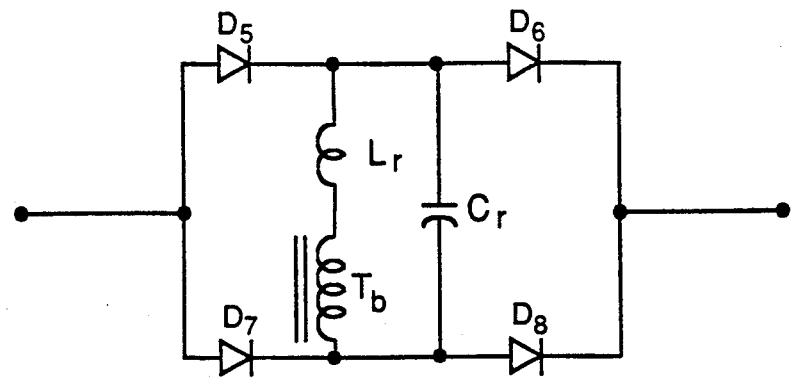
FIGS. 3A-3C schematic illustrations of alternative embodiments of the output boost circuits useful in the voltage-doubler rectifier of FIG. 2.
Figure 3B:
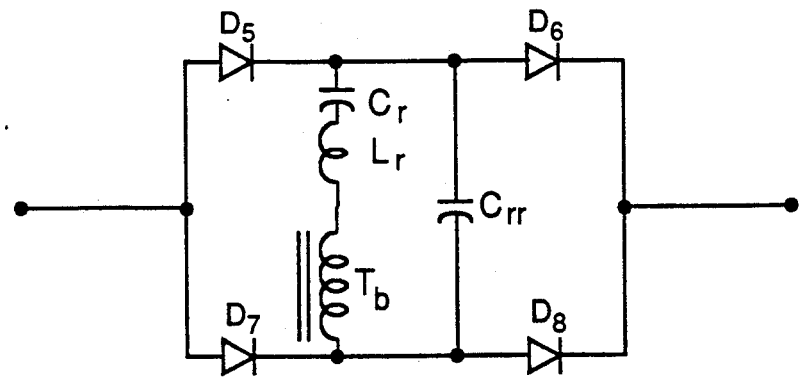

Although the output boost circuits 16 and 18 are illustrated as including series resonant circuits, it is to be understood that the advantages of the present invention may also be realized using other resonant circuit configurations. For example, as shown in FIG. 3A, a parallel resonant circuit configuration may be employed wherein the resonant capacitor $C_r$ is situated in parallel with the series combination of resonant inductor $L_r$ and the boost transformer secondary winding, rather than in series therewith as shown in FIG. 2. As another example, as shown in FIG. 3B, a combination series/parallel resonant circuit may be employed wherein another capacitor $C_{rr}$ is coupled in parallel with the series combination of resonant inductor $L_r$, resonant capacitor $C_r$ and the secondary winding of boost transformer $T_b$. Again, it is to be noted that the resonant circuit components may be situated on either the primary or secondary side of boost transformer $T_b$, as desired.

Figure 3C:
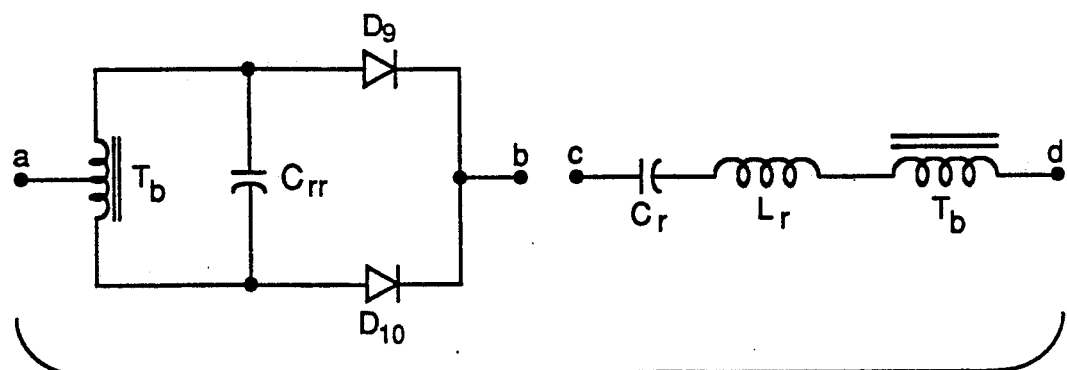

FIG. 3C illustrates another alternative embodiment of the output boost circuits 16 and 18 wherein a center-tapped boost transformer secondary winding is coupled to a center-tapped full-wave boost rectifier comprising diodes $D_9$ and $D_{10}$. For purposes of illustration, a combination series/parallel resonant circuit is shown with capacitor $C_r$ and inductor $L_r$ being situated between terminals c and d on the primary side of the boost transformer, and capacitor $C_{rr}$ being situated on the secondary side of the boost transformer.

As shown in FIG. 2, the primary winding 24 of an output transformer $T_o$ is coupled across the junctions joining the switching devices $Q_1$–$Q_2$ and $Q_3$–$Q_4$ of the respective fullbridge converter legs. The respective terminals of the secondary winding 25 of transformer $T_o$ are connected to the anodes of diodes $D_{11}$ and $D_{12}$. The cathodes of diodes $D_{11}$ and $D_{12}$ are connected to an output filter inductor $L_o$ and an output filter capacitor $C_o$. The regulated dc output voltage $E_{out}$ is provided across capacitor $C_o$.

Boost voltages $V_{ab}$ and $V_{a'b}$ are controlled by the switching frequency of full-bridge converter switching devices $Q_1$–$Q_4$ via a first ac signal generated across the resonant circuits and load by boost transformer $T_b$, while the dc output voltage $E_{out}$ is controlled by pulse width modulation (PWM) of a second ac signal generated across transformer $T_o$, i.e., by phase-shifting the two legs of the converter bridge with respect to each other. Because phase-shifting the fullbridge converter legs does not affect the voltage applied to the boost transformer $T_b$, the boost voltages $V_{ab}$ and $V_{a'b'}$ are independent of the output voltage $E_{out}$. As a result, a fast transient response can be attained for the boost output circuits 16 and 18 and the output voltage $E_{out}$ simultaneously.

A suitable control for the power converter of the present invention is described in Steigerwald and Kornrumpf U.S. Pat. No. 4,642,745, issued Feb. 10, 1987, which patent is incorporated by reference herein. The Steigerwald and Kornrumpf patent describes a PWM control for controlling the regulated dc output voltage $E_{out}$ by adjusting the duty cycle of the inverter output signal whenever an error is detected between a commanded dc output voltage $E_{out}$ and the actual dc output voltage $E_{out}$. In addition, the Steigerwald and Kornrumpf patent describes an active frequency control wherein the actual converter input current is compared with a commanded current in phase with the utility line voltage; any difference causes a frequency adjustment for controlling each output boost circuit. Advantageously, since the output boost circuits 16 and 18 and the output voltage $E_{out}$ of the present invention are completely decoupled, any adjustment of the dc output voltage using the Steigerwald and Kornrumpf control system will have negligible effect on the input current to the voltage-doubler rectifier of the present invention.

Advantageously, similar to the high power factor power supply of the Steigerwald patent application, Ser. No. 652,831, even with no active control of the ac line current, the voltage-doubler rectifier of the present invention operates with a relatively high power factor and low peak ac line current, due to the favorable gain characteristics of the resonant circuits. Hence, the frequency control portion of the Steigerwald and Kornrumpf control, U.S. Pat. No. 4,642,745, could be eliminated as described in the Steigerwald application, Ser. No. 652,831, thereby simplifying the controls for the voltage doubler provided that somewhat higher harmonic line currents can be tolerated.

As another advantage, as a result of the series connection of the output boost circuits between the rectifier and the dc-to-dc converter, the peak power rating of the output boost circuits is less than the total power delivered to the dc link $E_d$, and high power factor voltage-doubling is achieved without requiring a separate up-front converter. That is, a separate up-front converter is not required to convert the entire power as in conventional high power factor schemes.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A high power factor voltage-doubler rectifier for providing a dc output voltage, comprising:
   a rectifier including two pairs of series-connected diodes in a full-bridge configuration for providing a rectified ac voltage when coupled to an ac power line, said rectifier having a cathode and an anode;
   dc-to-dc converter means coupled between said dc output voltage and a common potential, said dc-to-dc converter means having first and second output boost circuits inductively coupled thereto, said first output boost circuit being coupled in series between the cathode of said rectifier and said dc output voltage, and said second output boost circuit being coupled in series, with a polarity opposite to that of said first output boost circuit, between the anode of said rectifier and said common potential;
   a pair of filter capacitors connected in series with a junction therebetween, the series combination of said filter capacitors being coupled between said dc output voltage and said common potential; and
   switch means coupled between the junction joining the diodes of one of said two pairs and the junction joining said filter capacitors, said switch means being closed to enable operation in a voltage-doubling mode for relatively low input ac line voltages, and said switch means being open to enable operation in a low boost mode for relatively high input ac line voltages, said output dc voltage being maintained in substantially the same range in both said modes of operation.

2. The voltage-doubler rectifier of claim 1 wherein said first and second output boost circuits each comprise a resonant circuit including a resonant capacitor and a resonant inductor, said first and second output boost circuits each including a boost transformer for coupling to said dc-to-dc converter means.

3. The voltage-doubler rectifier of claim 2 wherein each said resonant circuit comprises a series resonant circuit, said resonant capacitor being coupled in series with said resonant inductor.

4. The voltage-doubler rectifier of claim 2 wherein each said resonant circuit comprises a parallel resonant circuit, said resonant capacitor being coupled in parallel with a series combination of said resonant inductor and said boost transformer.

5. The voltage-doubler rectifier of claim 2 wherein each said resonant circuit comprises a combination series/parallel resonant circuit including an additional resonant capacitor coupled in parallel with a series combination of said resonant capacitor, said resonant inductor and said boost transformer.

6. The voltage-doubler rectifier of claim 1 wherein said dc-to-dc converter means further comprises:
   an inverter coupled between said dc output voltage and said common potential for providing a first ac signal for exciting said output boost circuits, said inverter further providing a second ac signal;
   an output rectifier for receiving said second ac signal and generating a second regulated dc output voltage therefrom; and
   pulse width modulation means coupled to said inverter for controlling the amplitude of said second regulated dc output voltage by pulse width modulating said second ac signal.

7. The voltage-doubler rectifier of claim 6, further comprising frequency modulation means for controlling the frequency of said first ac signal in a manner to cause said dc-to-dc converter means to draw substantially sinusoidal current from said ac power line in phase with the voltage of said power line.

* * * * *